United States Patent
Choi

(10) Patent No.: US 9,897,397 B2
(45) Date of Patent: Feb. 20, 2018

(54) OIL COOLER

(71) Applicant: Halla Visteon Climate Control Corp., Daejeon (KR)

(72) Inventor: Ji Hoon Choi, Daejeon (KR)

(73) Assignee: Hanon Systems, Daejeon-si (KR)

(*) Notice: Subject to any disclaimer, the term of this patent is extended or adjusted under 35 U.S.C. 154(b) by 226 days.

(21) Appl. No.: 14/751,200

(22) Filed: Jun. 26, 2015

(65) Prior Publication Data

US 2016/0033211 A1    Feb. 4, 2016

(30) Foreign Application Priority Data

Jul. 31, 2014  (KR) .................... 10-2014-0098047

(51) Int. Cl.
| | |
|---|---|
| *G05D 23/00* | (2006.01) |
| *F28F 9/02* | (2006.01) |
| *F28F 27/02* | (2006.01) |
| *F01M 5/00* | (2006.01) |
| *F16N 21/00* | (2006.01) |
| *F28D 1/053* | (2006.01) |
| *F28D 21/00* | (2006.01) |

(52) U.S. Cl.
CPC .......... *F28F 9/0256* (2013.01); *F01M 5/002* (2013.01); *F01M 5/007* (2013.01); *F16N 21/00* (2013.01); *F28F 9/0253* (2013.01); *F28F 27/02* (2013.01); *F28D 1/05366* (2013.01); *F28D 2021/0089* (2013.01); *F28F 2250/06* (2013.01); *F28F 2275/20* (2013.01)

(58) Field of Classification Search
CPC ........ F28F 9/0256; F28F 27/02; F01M 5/002; F01M 5/007; F16N 21/00
USPC .......... 165/96, 100, 101, 102, 103, 297, 298
See application file for complete search history.

(56) References Cited

U.S. PATENT DOCUMENTS

| | | | | |
|---|---|---|---|---|
| 2,164,605 | A * | 7/1939 | Young .................. | F28D 1/0535 123/41.1 |
| 2,322,047 | A * | 6/1943 | Mormile ............... | F01M 5/007 165/103 |
| 4,700,772 | A * | 10/1987 | Baumberger ......... | F22B 1/1838 122/32 |
| 5,477,919 | A * | 12/1995 | Karube ............... | F28D 1/05391 165/176 |
| 5,606,937 | A * | 3/1997 | Calhoun ............... | F01M 5/002 123/196 AB |
| 7,281,572 | B2 * | 10/2007 | Jung .................. | B60H 1/00328 165/153 |

(Continued)

FOREIGN PATENT DOCUMENTS

KR         101416419 B1     7/2014

*Primary Examiner* — Ljiljana Ciric
(74) *Attorney, Agent, or Firm* — James D. Miller; Shumaker, Loop & Kendrick, LLP

(57) ABSTRACT

An oil cooler includes a plurality of tubes having both ends each fixed to a pair of header tanks in the length direction to form channels. The oil cooler further includes heat radiation fins, a first flange having an inlet pipe and an outlet pipe each coupled thereto in the length direction, a second flange coupled to any one of the header tanks in the length direction, and a bypass valve installed between the first flange and the second flange. The fixing bolts bolt the first flange, the bypass valve, and the second flange together while penetrating through the first flange, the bypass valve, and the second flange in the length direction.

20 Claims, 6 Drawing Sheets

(56) References Cited

U.S. PATENT DOCUMENTS

| | | | | |
|---|---|---|---|---|
| 8,210,244 B2* | 7/2012 | Kuniavskyi | .......... | F01P 11/0204 |
| | | | | 165/101 |
| 8,596,339 B2* | 12/2013 | Palanchon | ............ | F28D 9/0031 |
| | | | | 165/103 |
| 8,978,992 B2* | 3/2015 | Zillig | .................... | F15B 21/042 |
| | | | | 137/468 |
| 2002/0014327 A1* | 2/2002 | Sasaki | ................. | F28D 1/05375 |
| | | | | 165/178 |
| 2003/0019620 A1 | 1/2003 | Pineo et al. | | |
| 2003/0217707 A1* | 11/2003 | Iwasaki | .................... | B60H 1/02 |
| | | | | 123/41.31 |
| 2007/0163760 A1* | 7/2007 | Seno | ....................... | F25B 39/04 |
| | | | | 165/132 |
| 2008/0179051 A1* | 7/2008 | Willis | ....................... | F28F 9/02 |
| | | | | 165/173 |
| 2013/0061584 A1* | 3/2013 | Gerges | ..................... | F01N 5/02 |
| | | | | 60/320 |
| 2015/0144080 A1* | 5/2015 | Neal | ..................... | F01M 5/002 |
| | | | | 123/41.44 |

* cited by examiner

OIL COOLER

CROSS-REFERENCE TO RELATED APPLICATIONS

This application claims priority to Korean Patent Application No. 10-2014-0098047 filed on Jul. 31, 2014 in the Korean Intellectual Property Office, the disclosure of which is incorporated herein by reference in its entirety.

FIELD OF THE INVENTION

The following disclosure relates to an oil cooler for cooling oil used in an automobile.

BACKGROUND OF THE INVENTION

A cooling module of an automobile is configured to include a radiator, a condenser, a fan shroud, an oil cooler, and the like.

The radiator is a device cooling an engine through heat exchange between a coolant and atmosphere.

The condenser is positioned at a front end of an engine room of the automobile and serves to cool a high temperature and high pressure gas refrigerant transferred from a compressor through heat exchange with air to convert the high temperature and high pressure gas refrigerant into a liquid-phase coolant.

The heat exchange of the condenser discharges heat obtained by the evaporator in a vehicle on an air conditioner system to the outside of the vehicle.

The fan shroud is positioned at the rear of the radiator and the condenser, and serves to operate a fan to forcibly pass wind therethrough, thereby maintaining cooling performance of the radiator and the condenser.

The fan shroud includes a fan having a pinwheel shape, a motor rotating the fan, and a shroud serving to support the motor and guide air, and is operated depending on a temperature of a coolant, an operation state of an air conditioner, a pressure of a refrigerant, and the like.

The oil cooler, which is a cooling device appropriately maintaining a temperature of oil including engine oil and mission oil, is divided into an embedded type water cooling oil cooler mounted in a radiator tank and an external type air cooling oil cooler mounted in a carrier, a cooling module, or the like.

The embedded type oil cooler serves to lower a temperature of the oil through heat exchange with a coolant, and the external type oil cooler serves to lower a temperature of the oil through heat exchange with atmosphere.

In addition, the oil cooler is installed with a bypass valve bypassing a low temperature oil so that the low temperature oil is not introduced into the oil cooler to thereby be cooled.

FIG. 1 is a schematic view of an oil cooler according to the related art.

As illustrated in FIG. 1, an oil cooler 1 according to the related art is configured to include a pair of header tanks 10 installed so as to be spaced apart from each other by a predetermined interval in a length direction; tubes 20 having both ends each fixed to the pair of header tanks in the length direction to form channels; heat radiation fins 30 interposed between the tubes; a bypass valve 50 connecting the header tank 10 to an inlet pipe 41 and an outlet pipe 42 in the length direction and bypassing oil transferred from the inlet pipe 41 to the header tank 10 to the outlet pipe 42 when a temperature of the oil is a predetermined temperature or less; and fixing bolts 60 bolting the bypass valve 50 while penetrating through the bypass valve 50 so as to be perpendicular to the length direction.

However, in the related art, a direction in which the fixing bolts are bolted and a direction in which the bypass valve is connected to the header tank are different from each other, such that bolting force of the fixing bolts is significantly decreased due to vibrations generated by oil moving in the bypass valve.

Particularly, in the related art, fatigue is easily accumulated in the fixing bolts to damage the fixing bolts, such that leakage is generated in the bypass valve.

Therefore, development of various oil coolers for solving the above-mentioned problems has been demanded.

As a technology associated with these oil coolers, a heat exchanger including a plug bypass valve has been suggested in U.S. Pat. Appl. Pub. No. 2003-0019620 A1.

SUMMARY OF THE INVENTION

An embodiment of the present invention is directed to providing an oil cooler capable of preventing bolting force of fixing bolts from being decreased or preventing damage to the fixing bolts caused by accumulation of fatigue in the fixing bolts, due to vibrations generated by movement of oil in a bypass valve and vibrations generated in a vehicle body by allowing a direction in which the fixing bolts bolt the bypass valve and a direction in which the bypass valve is connected to a header tank to be the same as each other (that is, a length direction).

In one general aspect, an oil cooler includes: a pair of header tanks 100 installed so as to be spaced apart from each other by a predetermined interval in a length direction; a plurality of tubes 200 having both ends each fixed to the pair of header tanks 100 in the length direction to form channels; heat radiation fins 300 interposed between the plurality of tubes 200; a first flange 500 having an inlet pipe 410 and an outlet pipe 420 each coupled thereto in the length direction; a second flange 600 coupled to any one of the header tanks 100 in the length direction; a bypass valve 700 installed between the first flange 500 and the second flange 600; and fixing bolts 800 bolting the first flange 500, the bypass valve 700, and the second flange 600 while penetrating through the first flange 500, the bypass valve 700, and the second flange 600 in the length direction.

The first flange 500 may be provided with a first insertion part 510 and a second insertion part 520 into which the inlet pipe 410 and the outlet pipe 420 are inserted, respectively, in the length direction, the second flange 600 may be provided with a first perforation part 610 and a second perforation part 620 being in communication with any one of the header tanks 100 in the length direction, and the bypass valve 700 may be provided with a first channel 710 connecting the first insertion part 510 and the first perforation part 610 to each other in the length direction and a second channel 720 connecting the second insertion part 520 and the second perforation part 620 to each other in the length direction.

The bypass valve 700 may include a bypass channel 730 connecting the first channel 710 and the second channel 720 to each other.

In the bypass valve 700, a space between the first channel 710 and the first perforation part 610 may be closed and the bypass channel 730 may be opened, when a temperature of oil introduced through the inlet pipe 410 is a predetermined temperature or more, and the space between the first channel 710 and the first perforation part 610 may be opened and the bypass channel 730 may be closed, when the temperature of the oil introduced through the inlet pipe 410 is the predetermined temperature or less.

The bypass valve 700 may include valve protrusions 740 protruding in a width direction, the first flange 500 may include first flange protrusions 530 protruding in the width direction so as to contact one side surfaces of the valve protrusions 740 in the length direction, and the second flange 600 may include second flange protrusions 630 protruding in the width direction so as to contact the other side surfaces of the valve protrusions 740 in the length direction.

The fixing bolts 800 may bolt the valve protrusions 740, the first flange protrusions 530, and the second flange protrusions 630 while penetrating through the valve protrusions 740, the first flange protrusions 530, and the second flange protrusions 630 in the length direction.

The number of fixing bolts 800 may be plural, and the fixing bolts 800 may bolt the valve protrusions 740, the first flange protrusions 530, and the second flange protrusions 630 while penetrating through the valve protrusions 740, the first flange protrusions 530, and the second flange protrusions 630 in each of one side direction and the other side direction in the length direction.

A plurality of the valve protrusions 740 may be formed so as to be spaced apart from each other by a predetermined distance in a height direction.

The valve protrusions 740 may protrude on both side surfaces of the bypass valve 700 in the width direction, respectively.

The oil cooler 1000 may further include a plurality of connectors 910 each installed between the first channel 710 and the first insertion part 510, between the first channel 710 and the first perforation part 610, between the second channel 720 and the second insertion part 520, and between the second channel 720 and the second perforation part 620.

The connectors 910 may include extension rings 915 formed on outer peripheral surfaces thereof so as to protrude outwardly.

The oil cooler 1000 may further include o-rings 920 mounted on the outer peripheral surfaces of the connectors 910 so as to contact the extension rings 915.

DETAILED DESCRIPTION OF MAIN ELEMENTS

Figure 1:
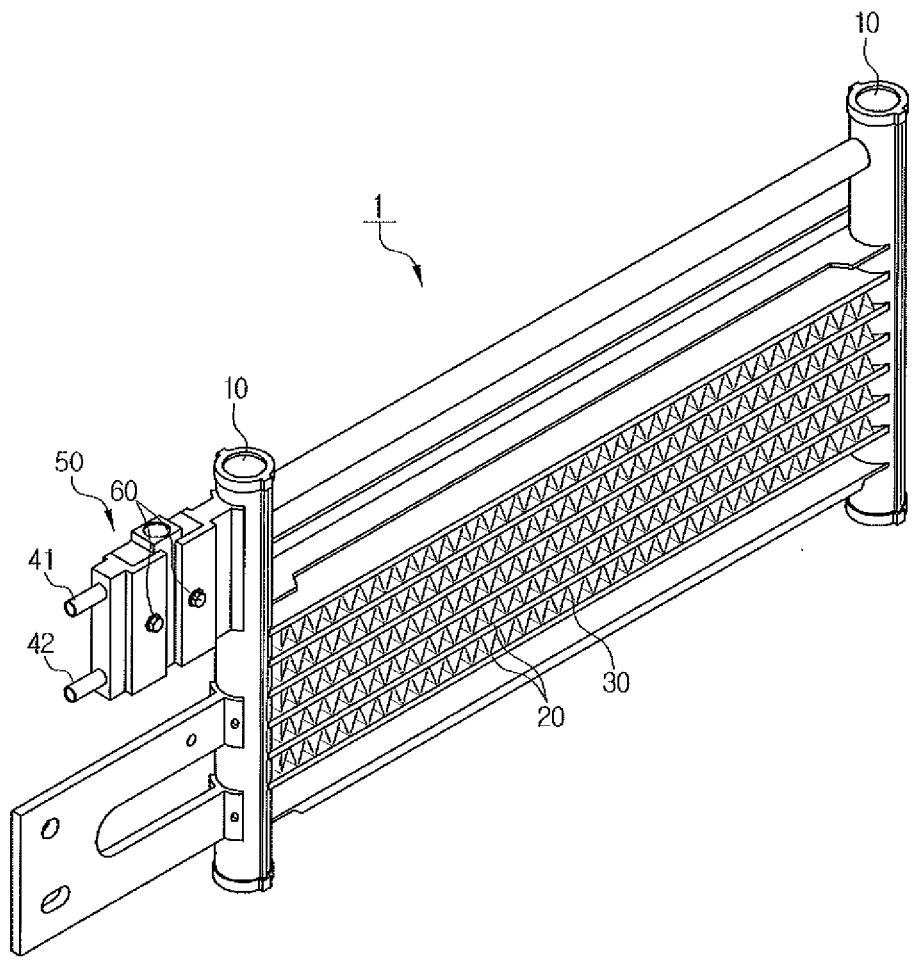
FIG. 1 is a schematic perspective view of an oil cooler according to the related art.

1000: oil cooler according to the present invention
100: header tank
200: tube
300: heat radiation fin
410: inlet pipe
420: outlet pipe
500: first flange
510: first insertion part
520: second insertion part
530: first flange protrusion
600: second flange
610: first perforation part
620: second perforation part
630: second flange protrusion
700: bypass valve
710: first channel
720: second channel
730: bypass channel
740: valve protrusion
800: fixing bolt
910: connector
915: extension ring
920: o-ring

DETAILED DESCRIPTION OF EXEMPLARY EMBODIMENTS OF THE INVENTION

Hereinafter; a technical spirit of the present invention will be described in more detail with reference to the accompanying drawings. It will be obvious to those skilled in the art that these examples are for illustrative purposes only and are not intended to limit the scope of the present invention.

The accompanying drawings are only examples illustrated in order to describe the technical idea of the present invention in more detail. Therefore, the technical idea of the present invention is not limited to forms of the accompanying drawings.

Figure 2:
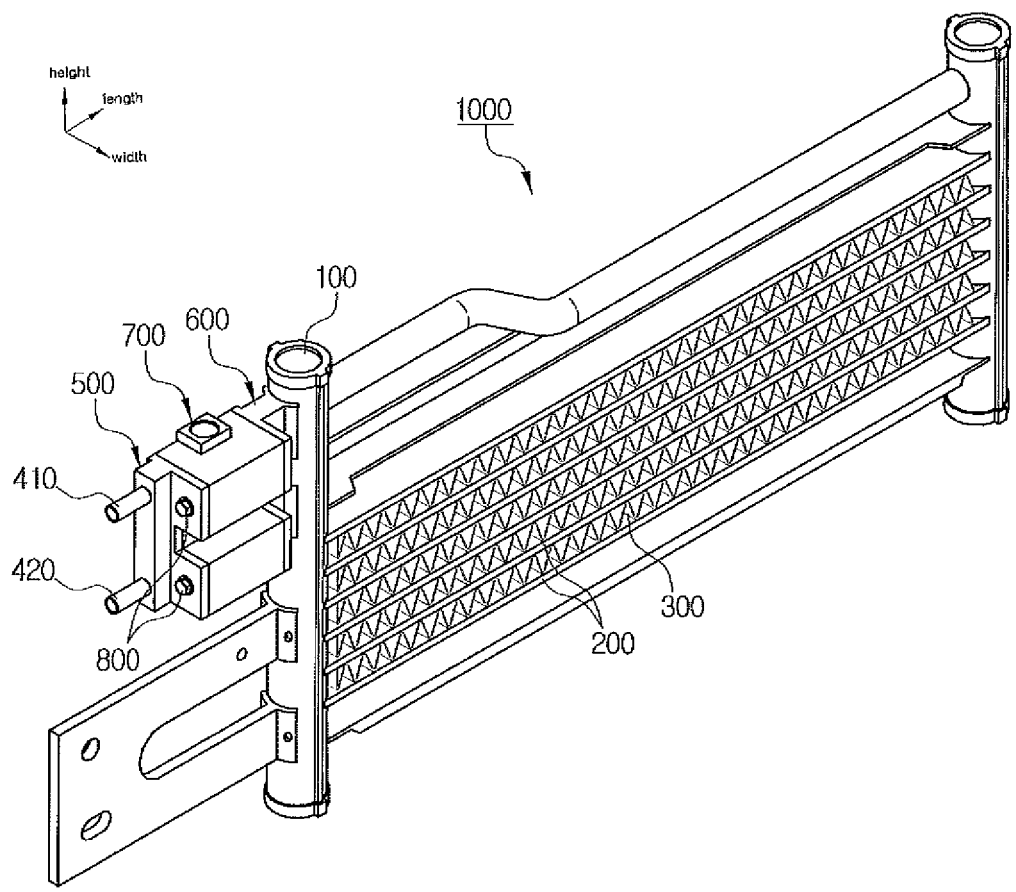
FIG. 2 is a perspective view of an oil cooler according to an embodiment of the present invention.
Figure 3:
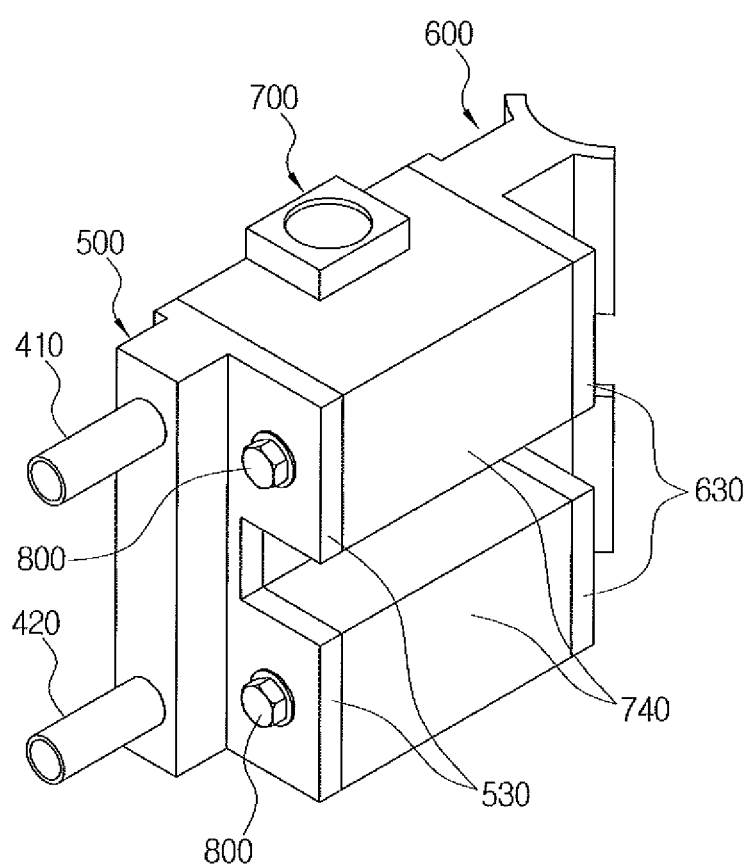
FIG. 3 is a perspective view of a region in which a bypass valve of the oil cooler of FIG. 2 according to the present invention is installed.
Figure 4:
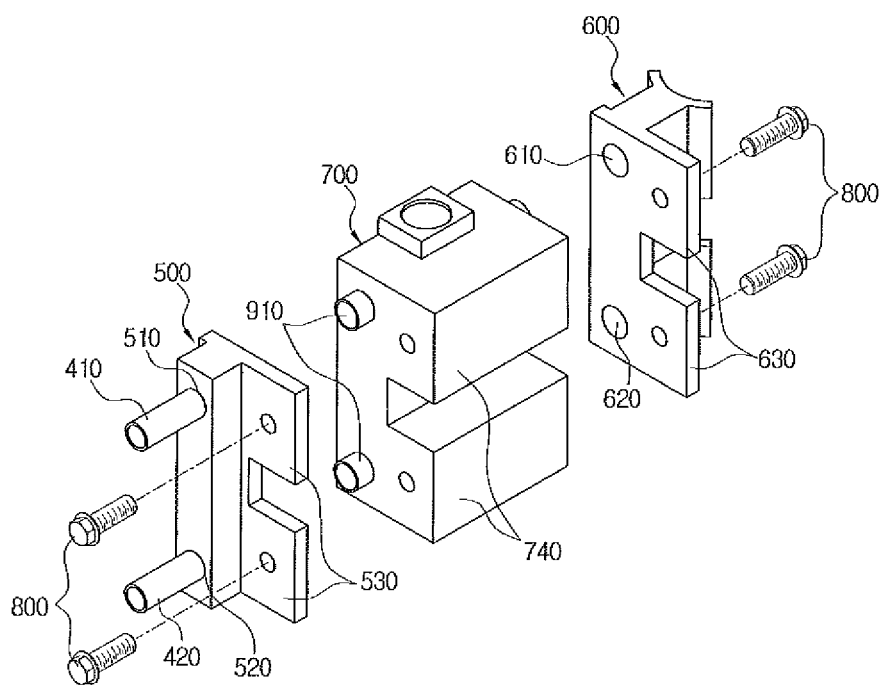
FIG. 4 is an exploded perspective view of the region in which the bypass valve of the oil cooler of FIG. 2 according to the present invention is installed.
Figure 5:
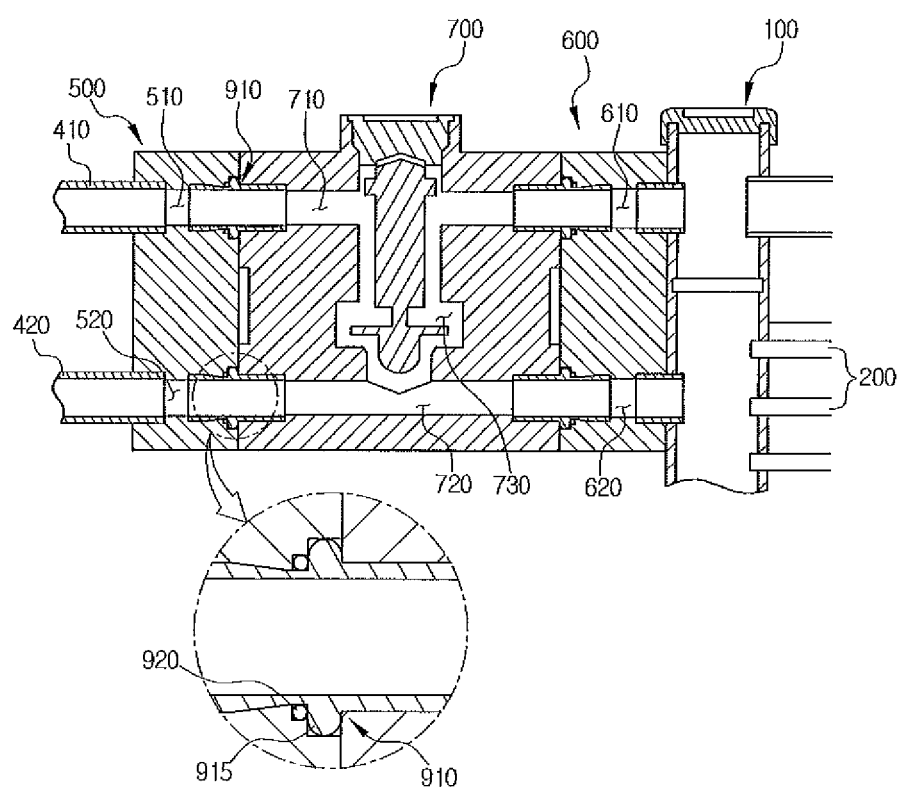
FIG. 5 is a cross-sectional view illustrating an inner portion of the region in which the bypass valve of the oil cooler of FIG. 2 according to the present invention is installed.

FIG. 2 is a perspective view of an oil cooler 1000 according to the present invention, FIG. 3 is a perspective view of a region in which a bypass valve 700 of the oil cooler 1000 according to the present invention is installed, FIG. 4 is an exploded perspective view of the region in which the bypass valve 700 of the oil cooler 1000 according to the present invention is installed, and FIG. 5 is a cross-sectional view illustrating an inner portion of the region in which the bypass valve 700 of the oil cooler 1000 according to the present invention is installed.

As illustrated in FIGS. 2 to 5, the oil cooler 1000 according to the present invention is configured to include a pair of header tanks 100, a plurality of tubes 200, a plurality of heat radiation fins 300, a first flange 500, a second flange 600, and a bypass valve 700.

The pair of header tanks 100 are formed by coupling a header and a tank to each other and are installed so as to be spaced apart from each other by a predetermined interval in a length direction.

The plurality of tubes 200 have both ends each fixed to the pair of header tanks 100 in the length direction to form channels.

The plurality of heat radiation fins 300 are interposed between the plurality of tubes 200 to increase a heating surface area with air flowing between the plurality of tubes 200.

The first flange 500 is provided with a first insertion part 510 and a second insertion part 520 into which an inlet pipe 410 through which oil is introduced and an outlet pipe 420 through which the oil is discharged are inserted, respectively, in the length direction.

In addition, the first insertion part 510 and the second insertion part 520 of the first flange 500 are formed so as to be spaced apart from each other by a predetermined interval in a height direction and form channels in which the oil moves, respectively.

The second flange 600 is provided with a first perforation part 610 and a second perforation part 620 coupled to any one of the header tanks 100 in the length direction and being in communication with an inner portion of any one of the header tanks 100 in the length direction.

In addition, the first perforation part 610 and the second perforation part 620 of the second flange 600 are formed so as to be spaced apart from each other by a predetermined interval in the height direction and form channels in which the oil moves, respectively.

The bypass valve 700 is provided with a first channel 710 connecting the first insertion part 510 and the first perforation part 610 to each other in the length direction, a second channel 720 connecting the second insertion part 520 and the second perforation part 620 to each other in the length direction, and a bypass channel 730 connecting the first channel 710 and the second channel 720 to each other.

The first channel 710 and the second channel 720 of the bypass valve 700 are formed so as to be spaced apart from each other by a predetermined interval in the height direction and form channels in which the oil moves, respectively.

Next, an oil flow of the oil cooler 1000 according to the present invention will be described.

First, the oil moving in the inlet pipe 410 is transferred to the first channel 710 of the bypass valve 700 through the first insertion part 510 of the first flange 500.

Next, in the case in which a temperature of the oil transferred to the first channel 710 of the bypass valve 700 is a predetermined temperature or less, such that the oil does not need to be cooled, the oil transferred to the first channel 710 of the bypass valve 700 is bypassed to the bypass channel 730 of the bypass valve 700 and is then transferred to the outlet pipe 420 through the second channel 720 of the bypass valve 700 and the second insertion part 520 of the first flange 500.

In this case, a space between the first channel 710 of the bypass valve 700 and the first perforation part 610 of the second flange 600 is closed, and the bypass channel 730 is opened, such that the oil transferred to the first channel 710 of the bypass valve 700 is bypassed to the bypass channel 730 of the bypass valve 700.

Since the opening and the closing correspond to opening and closing of a general valve, a detailed description therefor will be omitted.

Next, in the case in which a temperature of the oil transferred to the first channel 710 of the bypass valve 700 is a predetermined temperature or more, such that the oils needs to be cooled, the oil transferred to the first channel 710 of the bypass valve 700 is transferred to the header tank 100 and the tubes 200 through the first perforation part 610 of the second flange 600, is cooled, and is then transferred to the outlet pipe 420 through the second perforation part 620 of the second flange 600, the second channel 720 of the bypass valve 700, and the second insertion part 520 of the first flange 500.

In this case, a space between the first channel 710 of the bypass valve 700 and the first perforation part 610 of the second flange 600 is opened, and the bypass channel 730 is closed, such that the oil transferred to the first channel 710 of the bypass valve 700 is transferred to the header tank 100 and the tubes 200 through the first perforation part 610 of the second flange 600 and is then cooled.

The fixing bolts 800 bolt the first flange 500, the bypass valve 700, and the second flange 600 while penetrating the first flange 500, the bypass valve 700, and the second flange 600 in the length direction.

In the oil cooler according to the related art, a direction in which fixing bolts bolt a bypass valve and a direction in which a bypass valve is connected to an inlet pipe (or an outlet pipe) are different from each other, such that a bolting force of the fixing bolts is easily decreased due to vibrations generated by movement of the oil in the bypass valve and vibrations generated in a vehicle body.

However, in the oil cooler 1000 according to the present invention, a direction in which the fixing bolts 800 bolt the bypass valve 700 and a direction in which the bypass valve 700 is connected to the header tank 100 are the same as each other (that is, the length direction), thereby making it possible to prevent a bolting force of the fixing bolts from being decreased or prevent damage to the fixing bolts caused by accumulation of fatigue in the fixing bolts, due to vibrations generated by movement of the oil in the bypass valve 700 and vibrations generated in a vehicle body.

Meanwhile, in the oil cooler 1000 according to the present invention, valve protrusions 740 may be formed on the bypass valve 700, first flange protrusions 530 may be formed on the first flange 500, second flange protrusions 630 may be formed on the second flange 600, and the fixing bolts 800 may bolt the valve protrusions 740, the first flange protrusions 530, and the second flange protrusions 630 while penetrating through the valve protrusions 740, the first flange protrusions 530, and the second flange protrusions 630 in the length direction.

The valve protrusions 740 protrude on an outer surface of the bypass valve 700 in a width direction. Here, a plurality of valve protrusions 740 may be formed so as to be spaced apart from each other by a predetermined distance in the height direction.

The first flange protrusions 530 protrude so as to contact one side surfaces of the valve protrusions 740 in the length direction, and the second flange protrusions 630 protrude so as to contact the other side surfaces of the valve protrusions 740 in the length direction.

Therefore, in the oil cooler 1000 according to the present invention, the valve protrusions 740, the first flange protrusions 530, and the second flange protrusions 630 are provided as components for the fixing bolts 800 to bolt the bypass valve 700 while penetrating through the bypass valve 700 in the length direction, thereby making it possible to more simply perform a penetrating and bolting process of the fixing bolts 800.

Meanwhile, the oil cooler 1000 may further include a plurality of connectors 910 each installed between the first channel 710 and the first insertion part 510, between the first channel 710 and the first perforation part 610, between the second channel 720 and the second insertion part 520, and between the second channel 720 and the second perforation part 620.

The plurality of connectors 910, which are connection pipes connecting between the first channel 710 and the first insertion part 510, between the first channel 710 and the first perforation part 610, between the second channel 720 and the second insertion part 520, and between the second channel 720 and the second perforation part 620, serve to enhance air tightness.

In addition, the connectors 910 may have extension rings 915 formed on outer peripheral surfaces thereof, wherein the extension rings 915 are extended for the purpose of the air tightness.

It is preferable that the extension rings 915 are formed so as to contact one end or the other end of the bypass valve 700 in the length direction in order to enhance the air tightness. However, the present invention is not limited thereto.

In addition, the oil cooler 1000 according to the present invention may further include o-rings 920 installed on outer peripheral surfaces of the connectors 910.

The o-rings 920 are installed to contact the extension rings 915 of the connectors 910, thereby making it possible to further enhance the air tightness.

Figure 6:
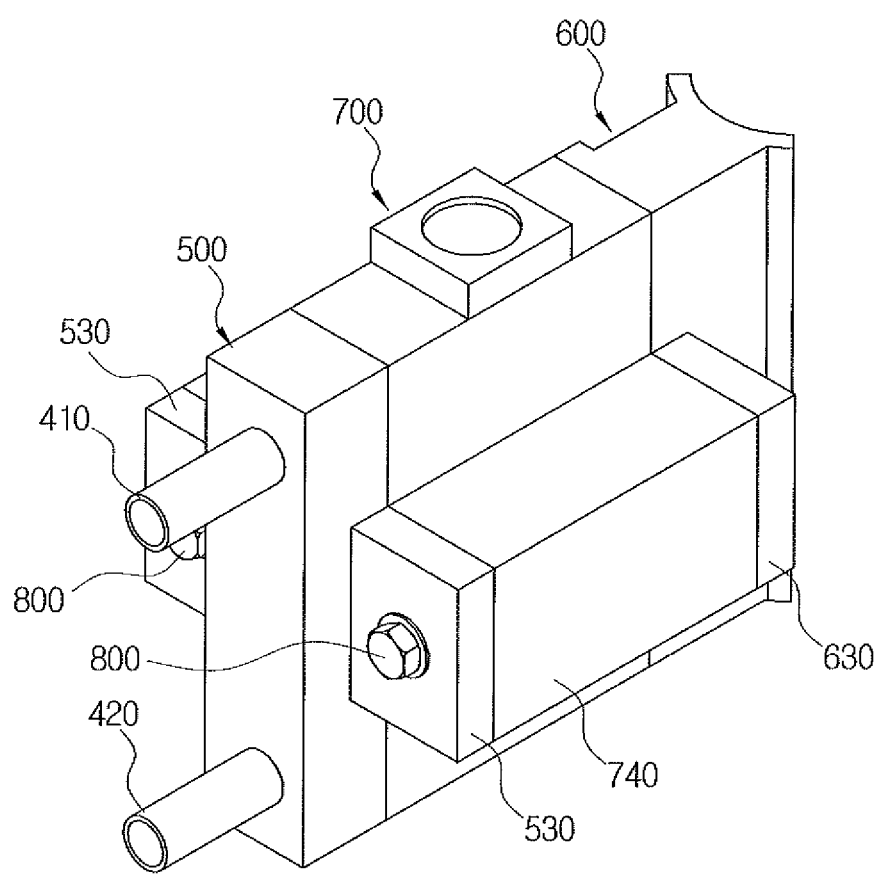
FIG. 6 is a perspective view of a region in which a bypass valve of the oil cooler according to an another embodiment of the present invention is installed.

FIG. 6 is a perspective view of a region in which a bypass valve of the oil cooler 1000 according to an exemplary embodiment of the present invention is installed.

As illustrated in FIG. 6, in the oil cooler 1000 according to the exemplary embodiment of the present invention, the valve protrusions 740 may be formed on the bypass valve 700 so as to protrude on both side surfaces of the bypass valve 700, respectively, in the width direction, the first flange protrusions 530 protruding so as to contact one end of the valve protrusions 740 in the length direction may be formed on the first flange 500, the second flange protrusions 630 protruding so as to contact the other end of the valve protrusions 740 in the length direction may be formed on the second flange 600, and the fixing bolts 800 may bolt the valve protrusions 740, the first flange protrusions 530, and the second flange protrusions 630 while penetrating through the valve protrusions 740, the first flange protrusions 530, and the second flange protrusions 630 in the length direction.

Therefore, in the oil cooler 1000 according to the exemplary embodiment of the present invention, the fixing bolts 800 are coupled to both side surfaces of the bypass valve 700 in the width direction, thereby making it possible to more firmly fix the bypass valve 700.

Therefore, in the oil cooler 1000 according to the present invention, the direction in which the fixing bolts 800 bolt the bypass valve 700 and the direction in which the bypass valve 700 is connected to the header tank 100 are the same as each other (that is, the length direction), thereby making it possible to prevent the bolting force of the fixing bolts from being decreased or prevent the damage to the fixing bolts 800 caused by the accumulation of the fatigue in the fixing bolts 800, due to the vibrations generated by the movement of the oil in the bypass valve 700 and the vibrations generated in the vehicle body.

The present invention is not limited to the above-mentioned exemplary embodiments, and may be variously applied, and may be variously modified without departing from the gist of the present invention claimed in the claims.

What is claimed is:

1. An oil cooler comprising:
a pair of header tanks spaced from each other along a length of the oil cooler;
a plurality of tubes extending between and in fluid communication with the pair of header tanks;
a plurality of heat radiation fins interposed between the plurality of tubes;
a first flange having an inlet pipe and an outlet pipe coupled thereto and extending outwardly therefrom in a direction parallel to the length of the oil cooler, each of the inlet pipe and the outlet pipe in fluid communication with the pair of header tanks;
a second flange coupled to one of the pair of header tanks;
a bypass valve disposed intermediate the first flange and the second flange; and
a fixing bolt coupling the first flange, the bypass valve, and the second flange to each other and extending through the first flange, the bypass valve, and the second flange in the direction parallel to the length of the oil cooler.

2. The oil cooler of claim 1, the first flange having a first insertion part and a second insertion part formed therein, the first insertion part receiving the inlet pipe and the second insertion part receiving the outlet pipe, the second flange having a first perforation part and a second perforation part formed therein and in fluid communication with the inlet pipe, the outlet pipe, and the pair of header tanks, and the bypass valve having a first channel providing fluid communication between the first insertion part and the first perforation part and a second channel providing fluid communication between the second insertion part and the second perforation part.

3. The oil cooler of claim 2, the bypass valve including a bypass channel providing fluid communication between the first channel and the second channel.

4. The oil cooler of claim 3, the inlet pipe receiving an oil and the bypass valve selectively closing one of the first channel and the bypass channel dependent on a temperature of the oil.

5. The oil cooler of claim 2, further comprising a plurality of connectors, a first one of the plurality of connectors disposed intermediate the first channel and the first insertion part, a second one of the plurality of connectors intermediate the first channel and the first perforation part, a third one of the plurality of connectors disposed intermediate the second channel and the second insertion part, and a fourth one of the plurality of connectors disposed intermediate the second channel and the second perforation part.

6. The oil cooler of claim 5, each of the plurality of connectors including an extension ring formed on and protruding outwardly from an outer peripheral surface thereof.

7. The oil cooler of claim 6, further comprising a plurality of O-rings, each of the plurality of O-rings disposed on the outer peripheral surface of one of the plurality of connectors.

8. The oil cooler of claim 7, each of the plurality of O-rings contacting one of the extension rings of the plurality of connectors.

9. The oil cooler of claim 1, the bypass valve including a valve protrusion extending outwardly therefrom in a direction parallel to a width of the oil cooler, the first flange including a first flange protrusion extending outwardly therefrom adjacent a first end of the valve protrusion and the second flange including a second flange protrusion extending outwardly therefrom adjacent a second end of the valve protrusion.

10. The oil cooler of claim 9, the fixing bolt extending through the valve protrusion, the first flange protrusion, and the second flange protrusion in the direction parallel to the length of the oil cooler.

11. The oil cooler of claim 10, the bypass valve including a plurality of valve protrusions extending outwardly therefrom, the first flange including a plurality of first flange protrusions extending outwardly therefrom, the second flange including a plurality of second flange protrusions extending outwardly therefrom, and the oil cooler comprising a plurality of fixing bolts, each of the fixing bolts extending through one of the plurality of valve protrusions, one of the plurality of first flange protrusions, and one of the plurality of second flange protrusions in the direction parallel to the length of the oil cooler.

12. The oil cooler of claim 9, a plurality of valve protrusions extending outwardly from the bypass valve, the plurality of valve protrusions spaced from each other in a direction parallel to a height of the oil cooler.

13. The oil cooler of claim 9, a plurality of valve protrusions extending outwardly from opposing sides of the bypass valve in the direction parallel to the width of the oil cooler.

14. An oil cooler comprising:
a pair of header tanks spaced from each other along a length of the oil cooler;
a plurality of tubes extending between and in fluid communication with the pair of header tanks;
a plurality of heat radiation fins interposed between the plurality of tubes;
a first flange having a first insertion part and a second insertion part formed therein, the first insertion part receiving an inlet pipe and the second insertion part receiving an outlet pipe, the inlet pipe and the outlet pipe extending outwardly from the first flange in a direction parallel to the length of the oil cooler, each of the inlet pipe and the outlet pipe in fluid communication with the pair of header tanks;
a second flange coupled to one of the pair of header tank and having a first perforation part and a second perforation part formed therein, the first perforation part providing fluid communication between the inlet pipe and the pair of header tanks and the second perforation part providing fluid communication between the pair of header tanks and the outlet pipe;
a bypass valve disposed intermediate the first flange and the second flange, the bypass valve having a first channel and a second channel formed therein, the first channel providing fluid communication between the first insertion part and the first perforation part and the second channel providing fluid communication between the second insertion part and the second perforation part; and
a fixing bolt coupling the first flange, the bypass valve, and the second flange to each other and extending through the first flange, the bypass valve, and the second flange in the direction parallel to the length of the oil cooler.

15. The oil cooler of claim 14, the bypass valve including a bypass channel providing fluid communication between the first channel and the second channel, the inlet pipe receiving an oil and the bypass valve selectively closing one of the first channel and the bypass channel dependent on a temperature of the oil.

16. The oil cooler of claim 14, the bypass valve including a valve protrusion extending outwardly therefrom in a direction parallel to a width of the oil cooler, the first flange including a first flange protrusion extending outwardly therefrom adjacent a first end of the valve protrusion, and the second flange including a second flange protrusion extending outwardly therefrom adjacent a second end of the valve protrusion.

17. The oil cooler of claim 16, the fixing bolt extending through the valve protrusion, the first flange protrusion, and the second flange protrusion in the direction parallel to the length of the oil cooler.

18. A method of cooling oil in an oil cooler of an automobile, comprising the steps of:
providing an oil cooler including a pair of header tanks spaced from each other along a length of the oil cooler, a plurality of tubes extending between the pair of header tanks, and a plurality of heat radiation fins interposed between the plurality of tubes;
disposing a first flange having an inlet pipe and an outlet pipe extending outwardly therefrom, a bypass valve, and a second flange adjacent one of the pair of header tanks, the bypass valve disposed intermediate the first flange and the second flange and having a first channel, a second channel, and a bypass channel formed therein, the first channel providing fluid communication between the inlet pipe and the pair of header tanks, the second channel providing fluid communication between the pair of header tanks and the outlet pipe, and the bypass channel providing fluid communication between the first channel and the second channel;
inserting a fixing bolt through the first flange, the bypass valve, and the second flange in a direction parallel to the length of the oil cooler;
conveying oil through the oil cooler; and
closing one of the first channel and the bypass channel with the bypass valve depending on a temperature of the oil.

19. The method of claim 18, the step of closing one of the first channel and the bypass channel includes the steps of:
closing the first channel when a temperature of the oil is less than a predetermined temperature with the bypass valve;
opening the bypass channel when the temperature of the oil is less than the predetermined temperature with the bypass valve;
closing the bypass channel when the temperature of the oil is one of greater than and equal to the predetermined temperature with the bypass valve; and
opening the first channel when the temperature of the oil is one of greater than and equal to the predetermined temperature with the bypass valve.

20. The method of claim 18, the bypass valve including a valve protrusion extending outwardly therefrom in a direction parallel to a width of the oil cooler, the first flange including a first flange protrusion extending outwardly therefrom adjacent a first end of the valve protrusion, the second flange including a second flange protrusion extending outwardly therefrom adjacent a second end of the valve protrusion, and the step of inserting the fixing bolt through the first flange, the bypass valve, and the second flange includes the step of inserting the fixing bolt through the valve protrusion, the first flange protrusion, and the second flange protrusion in the direction parallel to the length of the oil cooler.

* * * * *